United States Patent
Nagel (10) Patent No.: US 11,620,603 B2
(45) Date of Patent: Apr. 4, 2023

(54) SYSTEM AND METHOD FOR MANAGING OPERATOR SETTINGS FOR A WORK MACHINE

(71) Applicant: Caterpillar Paving Products Inc., Brooklyn Park, MN (US)

(72) Inventor: Brian D Nagel, Ramsey, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 62 days.

(21) Appl. No.: 17/458,234

(22) Filed: Aug. 26, 2021

(65) Prior Publication Data

US 2023/0069607 A1 Mar. 2, 2023

(51) Int. Cl.
| | |
|---|---|
| *G06Q 10/06* | (2012.01) |
| *G05D 1/00* | (2006.01) |
| *G06Q 10/0639* | (2023.01) |

(52) U.S. Cl.
CPC ..... *G06Q 10/06393* (2013.01); *G05D 1/0022* (2013.01); *G06Q 10/06398* (2013.01); *G05D 2201/021* (2013.01); *G05D 2201/0202* (2013.01)

(58) Field of Classification Search
None
See application file for complete search history.

(56) References Cited

U.S. PATENT DOCUMENTS

| | | |
|---|---|---|
| 8,736,434 B2 | 5/2014 | Miller et al. |
| 8,977,408 B1 | 3/2015 | Cazanas et al. |
| 10,179,591 B2 | 1/2019 | Todasco et al. |
| 10,885,528 B2 | 1/2021 | Lesesky |
| 10,997,534 B2 | 5/2021 | Hatfield et al. |
| 2014/0172238 A1 | 6/2014 | Craine |

(Continued)

FOREIGN PATENT DOCUMENTS

CN 103600351 A * 2/2014

OTHER PUBLICATIONS

Louis, Joseph, and Phillip S. Dunston. "Integrating IoT into operational workflows for real-time and automated decision-making in repetitive construction operations." Automation in Construction 94 (2018): 317-327. (Year: 2018).*

(Continued)

*Primary Examiner* — Thomas L Mansfield
(74) *Attorney, Agent, or Firm* — Lee & Hayes, PC (57) ABSTRACT

A work machine, such as a wheel loader, operating in a worksite within a wireless control system includes an operator-specific configuration of machine settings associated with an identification for the operator. As the work machine executes a work function, the operator identification, an initial operator-specific configuration, and sensed performance metrics are transmitted to a control system for the worksite. Linking the operator identification to one or both of the initial operator-specific configuration and the metrics, the control system analyzes performance of the work machine by the operator with increased granularity and flags potential irregularities. A modified operator-specific configuration to change operator performance is returned to the work machine and made to override the initial operator-specific configuration when the operator next takes control of the work machine.

20 Claims, 3 Drawing Sheets

(56) References Cited

U.S. PATENT DOCUMENTS

2021/0061199 A1    3/2021  Wynkoop et al.
2021/0097458 A1    4/2021  Brickner et al.
2021/0243951 A1*  8/2021  Vandike ............... G06V 20/188

OTHER PUBLICATIONS

Al-Jarrah, Omar Y., et al. "Intrusion detection systems for intra-vehicle networks: A review." IEEE Access 7 (2019): 21266-21289. (Year: 2019).*

* cited by examiner

SYSTEM AND METHOD FOR MANAGING OPERATOR SETTINGS FOR A WORK MACHINE

TECHNICAL FIELD

The present disclosure relates to a system and method for managing operator settings for a work machine based on machine performance detected by sensors. More specifically, the present disclosure relates to a system and method for evaluating performance of a work machine when controlled by an operator and for modifying operator-specific settings for the work machine to alter usage by the operator based on the performance.

BACKGROUND

Machines for performing heavy outdoor work, such as for construction, paving, or mining industries, include excavators, backhoes, dozers, loaders, and the like. Typically large and complex, these machines may be shared among several users at a job site. For instance, different operators may need to control the machine during a work shift for performing specialized tasks required by the job site. Or different operators may take control of the machine as personnel changes between work shifts.

These large machines often have many settings that an operator can select before or during a work activity. Example settings range from operator comforts, such as a position for a seat or a temperature in the operator cabin, to modes of operation for the machine, such as activating an "Eco" mode or a differential lock. The modes of operation set by an operator can change the behavior and functionality of the machine, which can impact machine performance. For instance, one mode of operation may affect fuel consumption, tire wear, or structural deterioration over time differently than another mode of operation.

Otherwise known as a configuration, a collection of settings for a machine chosen by an operator for the same work activity may differ between users, whether due to personal preference or experience in operating the equipment. Accordingly, as control of the work machine shifts from operator to operator over time, the settings for the machine will also be changed. It is inefficient to require an operator to adjust all machine settings manually when assuming control of the machine from a previous operator.

One approach for accessing and adjusting operator-specific configurations for a work machine is described in U.S. Patent App. Pub. No. 2021/0061199 ("the '199 application"). The '199 application describes a work machine having an electronic controller that stores machine parameters associated with respective machine operators. The work machine receives signals from a user device, such as a cellular phone, that identify a new operator for the machine. In response, the electronic controller logs the new operator into the machine, retrieves the saved machine parameters corresponding to the new operator, and sets up the machine according to the retrieved machine parameters. The system described in the '199 application, however, does not consider the impact machine parameters and their corresponding modes of operation have on machine performance. Nor does the system of the '199 application evaluate the machine parameters chosen by the operator with respect to operability of the work machine.

Examples of the present disclosure are directed to overcoming deficiencies of such systems.

SUMMARY

In an aspect of the present disclosure, a method includes receiving, by an electronic controller of a work machine, an operator identification associated with an operator of the work machine and receiving, by the electronic controller, a configuration for the work machine specific to the operator identification. The configuration includes one or more machine settings for an operation of the work machine. The method further includes executing the operation of the work machine using the one or more machine settings of the configuration based, at least in part, on first electronic commands provided to components of the work machine from the electronic controller. One or more sensors on the work machine detect metrics relating to the performance of the work machine and at least the operator identification, the configuration, and the metrics are communicated over a network connection from the work machine to one or more servers. The machine then receives wirelessly the operator identification and a modified configuration for the work machine specific to the operator identification, where the modified configuration differs from the configuration due at least in part to the metrics. Finally, the operation of the work machine is executed using one or more modified settings of the modified configuration based, at least in part, on one or more second electronic commands provided to the components of the work machine from the electronic controller.

In another aspect of the present disclosure, a system includes a work machine and one or more servers coupled to the work machine through a wireless network. The work machine has at least one or more sensors and a controller. The one or more sensors are configured to detect performance characteristics of the work machine during a first instance of a work activity executed by an operator, and the controller is configured to cause the performance characteristics and an initial operator-specific configuration for the work machine to be transmitted across the wireless network, where the initial operator-specific configuration are associated with an identification of the operator. The one or more servers include one or more processors and one or more computer-readable media, where the one or more computer-readable media store computer-executable instructions that, when executed, cause the one or more processors to perform operations. The operations include receiving the performance characteristics and the initial operator-specific configuration from the work machine, accessing benchmark data associated with at least one of the performance characteristics and the initial operator-specific configuration, and generating a new operator-specific configuration for the work machine based, at least in part, on the benchmark data. In addition, the controller of the work machine is further configured to override the initial operator-specific configuration with the new operator-specific configuration for a second instance of the work activity executed by the operator.

In yet another aspect of the present disclosure, a machine has at least an engine, a work tool, one or more sensors configured to detect performance characteristics of the machine during execution of a work activity, and an electronic controller. The electronic controller is configured to receive an operator identification associated with an operator of the machine, receive initial settings for the machine specific to the operator identification, cause a first execution of the work activity by the machine using the initial settings, and cause the operator identification, the initial settings, and the performance characteristics to be sent to one or more servers over a network connection. The electronic controller is further configured to receive modified settings for the machine specific to the operator identification, the modified settings differing from the initial settings due at least in part to the performance characteristics detected by the one or more sensors, and to cause a second execution of the work activity using the modified settings.

DETAILED DESCRIPTION

Figure 1:
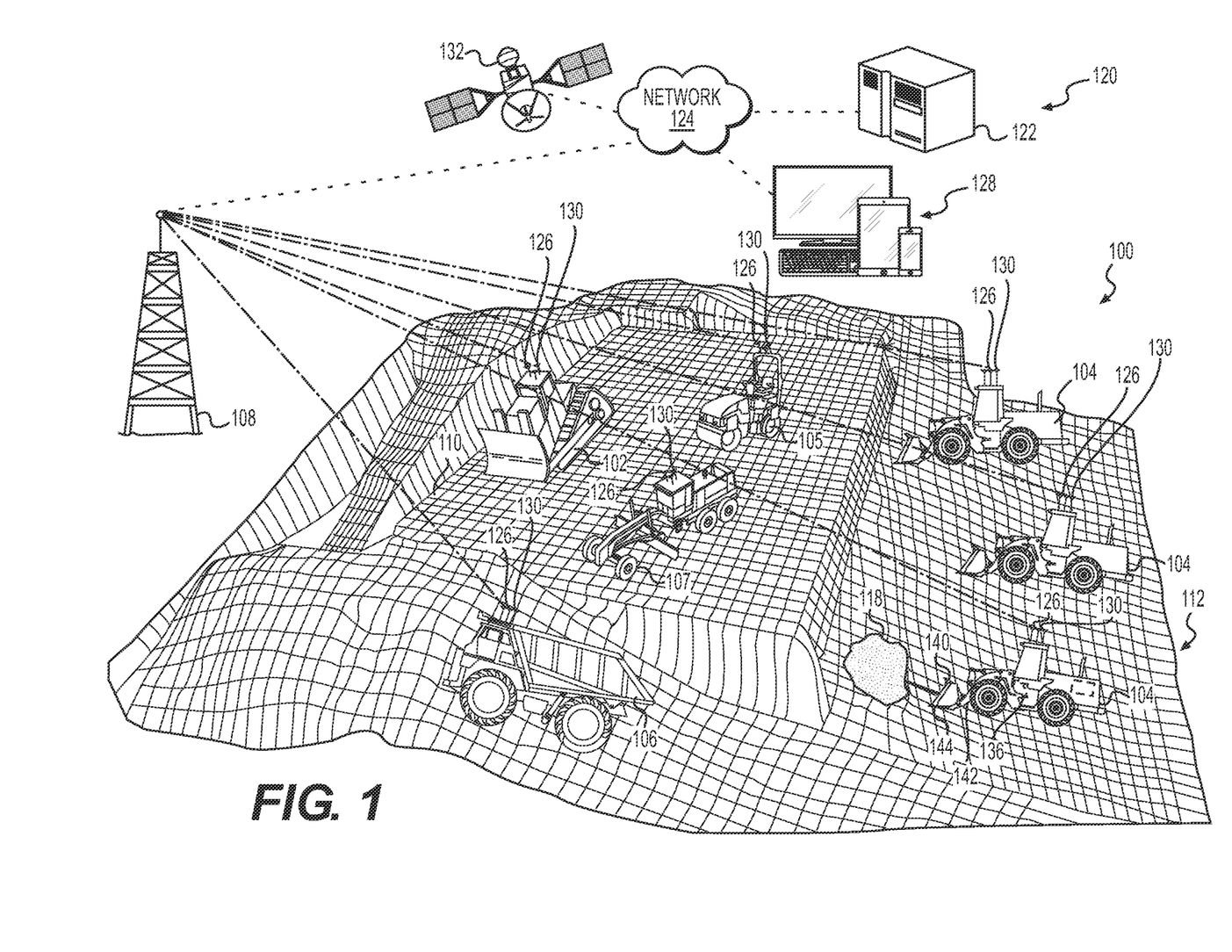
FIG. 1 is a schematic illustration of a system and worksite in accordance with an example of the present disclosure.

Wherever possible, the same reference numbers will be used throughout the drawings to refer to same or like parts. Referring to FIG. 1, an example system 100 may include one or more machines 102, 104, 105, 106, 107 operating at a worksite 112 to perform various tasks. The term "machine" as used in this disclosure refers to any machine that performs some type of work operation associated with an industry, such as mining, construction, farming, landscaping, or transportation. For example, system 100 may include one or more digging machines 102, one or more loading machines 104, one or more compacting machines 105, one or more hauling machines 106, one or more grading machines 107 and/or other types of machines used for construction, mining, paving, excavation, and/or other operations at worksite 112.

Machines 102, 104, 105, 106, 107 perform a variety of tasks well known to those of ordinary skill in the art. For instance, digging machine 102 refers to any machine that reduces material at worksite 112 for the purpose of subsequent operations (i.e., for blasting, loading, hauling, and/or other operations) and includes excavators, backhoes, dozers, drilling machines, trenchers, and drag lines, among other types of digging machines. Loading machine 104 refers to any machine that lifts, carries, loads, and/or removes material that has been reduced by one or more of digging machines 102 and includes a wheeled or tracked loader, a front shovel, an excavator, a cable shovel, and a stack reclaimer, among other types of loading machines 104. Hauling machine 106 refers to any machine that carries the excavated materials between different locations within worksite 112 and includes an articulated truck, an off-highway truck, an on-highway dump truck, and a wheel tractor scraper, among other types of hauling machines 106. Compacting machine 105 refers to any machine that is configured to apply stress on a work surface 110 of worksite 112 and cause densification of soil thereon and/or obtains an acceptable surface finish. Grading machine 107 refers to any machine that is configured to create a flat surface by grading material such as soil at worksite 112 for subsequent operations, for example, for a compacting operation and includes scrapers, bulldozers, motor graders or other similar machines commonly known in the art to create a flat surface during operation.

As described herein, machines 102, 104, 105, 106, 107 may be operated semi- or fully-autonomously. The term "autonomous" is meant to be understood broadly as any operation which is either completely automatic or substantially automatic, that is, without significant human involvement in the operation. An autonomous vehicle (e.g., the machines 102, 104, 105, 106, 107) will generally be unmanned, that is without a human pilot or co-pilot. However, an autonomous vehicle may be driven or otherwise operated automatically and have one or more human passengers. Similarly, the term "semi-autonomous" is meant to be understood broadly as any operation which is at least partially automatic and at least partially brought about by human involvement in the operation, that is, with at least some human involvement in the operation.

With continued reference to FIG. 1, system 100 may include a control system 120 and system controller 122 to control and/or coordinate data transmission between various elements within system 100. In some examples, control system 120 and/or system controller 122 are located at a command center (not shown) remote from worksite 112. In other examples, system controller 122 and/or one or more components of control system 120 are located at the worksite 112. Regardless of the location, components of control system 120 are configured to facilitate communications between, to provide information to, and to receive information from, digging machines 102, loading machines 104, hauling machines 106, compacting machines 105, grading machines 107, and/or other machines of system 100. In any of the examples described herein, the functionality of system controller 122 may be distributed so that certain operations are performed at worksite 112 and other operations are performed remotely such as, for example, at the remote command center noted above.

System controller 122 is an electronic controller that operates in a logical fashion to perform operations such as execute control algorithms, store and retrieve data, and other similar operations. System controller 122 may additionally include any other components required for running an application including but not limited to access memory, secondary storage devices, processors, and the like. The memory and secondary storage devices may be in the form of read-only memory (ROM), random access memory (RAM) or integrated circuitry that is accessible by the controller. Various other circuits may be associated with system controller 122 including but not limited to power supply circuitry, signal conditioning circuitry, driver circuitry, and other types of circuitry.

System controller 122 may be a single controller or may include more than one controller. In examples where system controller 122 includes more than one controller, system controller 122 includes additional controllers associated with digging machines 102, loading machines 104, hauling machines 106, compacting machines 105, grading machines 107, and/or other machines of system 100 configured to control various functions and/or features of system 100. As used herein, the term "controller" is meant in its broadest sense to include one or more controllers, processors, central processing units, and/or microprocessors that may be associated with the system 100, and that may cooperate in controlling various functions and operations of the machines included in the system 100. The functionality of system controller 122 may be implemented in hardware and/or software without regard to the functionality. System controller 122 may rely on one or more data maps, look-up tables, neural networks, algorithms, machine learning algorithms, and/or other components relating to the operating conditions and the operating environment of system 100 that may be stored in the memory of system controller 122. The data maps noted above may include a collection of data in the form of tables, graphs, and/or equations to maximize the performance and efficiency of system 100 and its operation.

The components of control system 120 may be in communication with and/or otherwise operably connected to any of the components of system 100 via a network 124. The network 124 may be a local area network ("LAN"), a larger network such as a wide area network ("WAN"), or a collection of networks, such as the Internet. Protocols for network communication, such as transmission control protocol/Internet protocol (TCP/IP), may be used to implement network 124. Although examples are described herein as using a network 124 such as the Internet, other distribution techniques may be implemented that transmit information via memory cards, flash memory, or other portable memory devices.

It is also understood that digging machines 102, loading machines 104, hauling machines 106, compacting machine 105, grading machine 107, and/or other machines of the system 100 may include respective controllers, and the respective controllers described herein (including the system controller 122) may be in communication and/or may otherwise be operably connected via the network 124. For example, network 124 may comprise a component of a wireless communication system of system 100, and as part of such a wireless communication system, digging machines 102, loading machines 104, hauling machines 106, compacting machines 105, grading machines 107, and/or other machines of the system 100 may include respective communication devices 126. Such communication devices 126 may be configured to permit wireless transmission of a plurality of signals, instructions, and/or information between system controller 122 and respective controllers of digging machines 102, loading machines 104, hauling machines 106, compacting machines 105, grading machines 107, and/or other machines of system 100.

In some examples, communication devices 126 may also enable communication (e.g., via the central station 108 and over the network 124) with one or more tablets, computers, cellular/wireless telephones, personal digital assistants, mobile devices, or other electronic devices 128 located at worksite 112 and/or remote from worksite 112. Such electronic devices 128 may comprise, for example, mobile phones and/or tablets of project managers (e.g., foremen) overseeing operations at worksite 112 or at a non-line-of-sight (NLOS) location with respect to worksite 112. As used herein, the term "non-line-of-sight (NLOS)" is meant to be understood broadly as any location with respect to worksite 112 that is obstructed by a physical object such that electromagnetic waves cannot propagate between the location and worksite 112.

Network 124, communication devices 126, and/or other components of the wireless communication system may implement or utilize any system or protocol including any of a plurality of communications standards. The protocols will permit communication between system controller 122, one or more of communication devices 126, and/or any other machines or components of system 100. Examples of wireless communications systems or protocols that may be used by system 100 include a wireless personal area network such as Bluetooth® (e.g., Institute of Electrical and Electronics Engineers (IEEE) 802.15), a local area network such as IEEE 802.11b or 802.11g, a cellular network, or any other system or protocol for data transfer. Other wireless communication systems and configurations are contemplated. In some instances, wireless communications may be transmitted and received directly between control system 120 and a machine of system 100 or between such machines. In other instances, the communications may be automatically routed without the need for re-transmission by remote personnel.

In example embodiments, one or more machines of system 100 (e.g., digging machines 102, loading machines 104, hauling machines 106, compacting machines 105, grading machines 107, among other machines) may include a location sensor 130 configured to determine a location, speed, heading, and/or orientation of the respective machine. In such embodiments, communication device 126 of the respective machine may be configured to generate and/or transmit signals indicative of such determined locations, speeds, headings, orientations, haul distances, and/or area covered, to, for example, system controller 122 and/or to the other respective machines of system 100 as detected by location sensor 130. In some examples, location sensors 130 of the respective machines may include and/or comprise a component of global navigation satellite system (GNSS) or a global positioning system (GPS). Alternatively, universal total stations (UTS) may be utilized to locate respective positions of the machines. In example embodiments, one or more of location sensors 130 comprise a GPS receiver, transmitter, transceiver, laser prisms, and/or other such device, and the location sensor 130 is in communication with one or more GPS satellites 132 and/or UTS to determine a respective location of the machine to which location sensor 130 is connected continuously, substantially continuously, or at various time intervals. One or more additional machines of system 100 may also be in communication with the one or more GPS satellites 132 and/or UTS, and such GPS satellites 132 and/or UTS may also be configured to determine respective locations of such additional machines.

Machine data may be obtained by a number of sensors 134 coupled to machines 102, 104, 105, 106, 107, processed by machine controller 136 of the respective machine 102, 104, 105, 106, 107, and transmitted to other computing devices such as system controller 122, electronic devices 128, and/or other data processing devices within system 100. Although one sensor 134 is depicted in association with each of machines 102, 104, 105, 106, 107, each machine may include a plurality of sensors 134 used to detect a plurality of different environmental and other parameters associated with machines 102, 104, 105, 106, 107. The sensors 134 may detect any parameter such as, for example, light, motion, temperature, magnetic fields, electrical fields, gravity, velocity, acceleration in any number of directions, humidity, moisture, vibration, pressure, and sound, among other parameters. Thus, sensors 134 may include accelerometers, thermometers, proximity sensors, electric filed proximity sensors, magnetometer, barometers, seismometer, pressure sensors, and acoustic sensors, among other types of sensors. Corresponding data associated with the type of sensor may be gathered. Thus, data obtained via the sensors may be transmitted to machine controller 136 of respective machines 102, 104, 105, 106, 107 for further transmission and/or processing. Examples of machine data gathered from sensors 134 include operator manipulation of the input devices, tool, or power source, machine velocity, machine location, fluid pressure, fluid flow rate, fluid temperature, fluid contamination level, fluid viscosity, electric current level, electric voltage level, fluid (e.g., fuel, water, oil) consumption rates, payload level, payload value, percent of maximum allowable payload limit, payload history, payload distribution, transmission output ratio, cycle time, idle time, grade, recently performed maintenance, or recently performed repair.

The machine data may be machine telematics data that includes, for example, a location of the machines, utilization data that defines the manner, location, duration, and functions used by the machines, specifications of the machines, the health of the machines, the data obtained from the sensors 134, and other telematics data. Telematics, as used herein, means the complete measuring, transmitting, and receiving of data defining a value of a quantity at a distance, by electrical translating means such as a wired or wireless communication network including the network 124.

As an example, information may be received from sensors 134 on respective machines 102, 104, 105, 106, 107 and/or site sensors proximate to a user such as the operators of machines 102, 104, 105, 106, 107 and/or personnel at worksite 112 where machines 102, 104, 105, 106, 107 are operated. Sensors may include: a thermometer for measuring temperature, anemometer for measuring wind speed, wind vane for measuring wind direction, hygrometer for measuring humidity, barometer for measuring atmospheric pressure, visual sensor for measuring visibility/distance, rain gauge for measuring precipitation, soil/ground sensors for measuring soil moisture, ground condition sensors for compaction, stability and moisture, gas sensors for measuring CO, methane, hydrogen sulfide, nitrogen dioxide, and lack of oxygen, and the like. The central station 108 may analyze the data and transmit information on a communication channel defined herein.

The data transmitted to the central station 108 may include operator data, machine identification data, performance data, worksite data, site condition data, diagnostic data, and other data, which may be automatically monitored from onboard the machine and/or manually observed and input by machine operators. The information remotely transmitted back to machines 102, 104, 105, 106, 107 may include electronic terrain maps, machine configuration commands, instructions, recommendations and/or the like.

In one example, the telematics data includes machine-specific data, such as identification data associated with a type of machine (e.g., digging, loading, hauling, etc.), a make and model of machine (e.g., Caterpillar 797 OHT), a machine manufacture date or age, a usage or maintenance/repair history, etc. The identification data for some examples includes a unique identifier for each of the machines 102, 104, 105, 106, 107 such as a license plate, a vehicle identification number (VIN), and a media access control (MAC) address associated with machine controllers 136 and/or communication devices 126 of the respective machines 102, 104, 105, 106, 107, among other types of unique identifiers. In one example, the unique identifier may be assigned to a machine 102, 104, 105, 106, 107 and stored in memory such as memory associated with system controller 122 and/or machine controller 136 of respective machine 102, 104, 105, 106, 107.

Operator-specific data may include an identification of a current operator, information about the current operator (e.g., a skill or experience level, an authorization level, an amount of time logged during a current shift, a usage history, etc.), a history of past operators. Site-specific data may include a task currently being performed by the operator, a current location at worksite 112, a location history, a material composition at a particular area of worksite 112, a site-imposed speed limit, etc.

Performance data may include current and historic data associated with operation of any machine at worksite 112. Performance data may include, for example, payload information, efficiency information, productivity information, fuel economy information, speed information, traffic information, weather information, road and/or surface condition information, maneuvering information (e.g., braking, steering, wheel slip, etc.), downtime and repair or maintenance information, etc.

Diagnostic data may include recorded parameter information associated with specific components and/or systems of the machine. For example, diagnostic data may include engine temperatures, engine pressures, engine and/or ground speeds and acceleration, fluid characteristics (e.g., levels, contamination, viscosity, temperature, pressure, etc.), fuel consumption, engine emissions, braking conditions, transmission characteristics (e.g., shifting, torques, and speed), air and/or exhaust pressures and temperatures, engine calibrations (e.g., injection and/or ignition timings), wheel torque, rolling resistance, system voltage, etc. Some diagnostic data may be monitored directly, while other data may be derived or calculated from the monitored parameters. Diagnostic data may be used to determine performance data, if desired.

GPS satellites 132, UTS, and/or central station 108 may be used to receive machine data from digging machines 102, loading machines 104, hauling machines 106, compacting machines 105, grading machines 107, and/or other machines of the system 100. Further, GPS satellites 132, UTS, and/or central station 108 may be used to transmit machine data to system controller 122 or other data processing device or system within system 100.

Thus, as described herein, each of machines 102, 104, 105, 106, 107 may report production metrics of various types. In one example, system controller 122, electronic devices 128, one or more of communication devices 126, and/or any other desired machines or components of the system 100 may continuously or periodically send requests to the respective communication devices 126 of machines 102, 104, 105, 106, 107 requesting data obtained from sensors 134. In another example, sensors 134 may sense the environment, and that data may be continuously or periodically transmitted to system controller 122, electronic devices 128, one or more of the communication devices 126, and/or any other desired machines or components of system 100 via communication devices 126 and/or machine controllers 136. In one example, sensors 134 may sense the environment, and that data may be stored in, for example, data storage devices associated with communication devices 126, machine controllers 136, system controller 122, electronic devices 128, and/or any other desired machines or components of system 100.

Thus, as described above, each of machines 102, 104, 105, 106, 107 may report production metrics in the form of progress indicators (PIs) of different types. Truck loads delivered by the machines 102, 104, 105, 106, 107 and/or a final grade (e.g., via grade control, manual survey, or drone flight) of worksite 112 may be measured to determine progress of the individual tasks within the worksite plan and the entire worksite plan such as a mass excavation project that utilizes a plurality of different machines 102, 104, 105, 106, 107. The PIs may be used to identify underperforming machines 102, 104, 105, 106, 107 within the worksite plan as well as to allow supervisors, foremen, managers, crew members, and other individuals associated with the worksite plan to know how far along the worksite plan has progressed and how much of the worksite plan may be left to complete. The PIs may be presented on a user interface on, for example, the display devices of electronic devices 128, a display device associated with system controller 122, and/or another display device associated the within system 100.

With the display of these production metrics, a user, such as the supervisors, managers, crew members or other individuals associated with the worksite plan, may understand each individual production metric as defined by the PIs as it relates to the tasks and the overall worksite plan. The data sensed by sensors 134 and transmitted from machines 102, 104, 105, 106, 107 may be processed by, for example, system controller 122 using on one or more data maps, look-up tables, neural networks, algorithms, machine learning algorithms, and/or other components to present the data as PIs to the users.

With continued reference to FIG. 1, and as noted above, each of machines 102, 104, 105, 106, 107, and/or other machines of the system 100 includes a machine controller 136. Machine controller 136 comprises a component of a local control system on-board and/or otherwise carried by the respective machine 102, 104, 105, 106, 107. Machine controllers 136 are any embedded system within the machines 102, 104, 105, 106, 107 that controls at least one of the electrical systems or subsystems in the machines 102, 104, 105, 106, 107, and thus at least one function of the machines 102, 104, 105, 106, 107. Such machine controllers 136 may be generally similar or identical to system controller 122 of control system 120. For example, each such machine controller 136 may comprise one or more processors, a memory, and/or other components described herein with respect to system controller 122. The machine controllers 136 may include an electronic control unit (ECU) such as, for example, an electronic control module (ECM), a powertrain control module (PCM), a transmission control module (TCM), a brake control module (EBCM), a central control module (CCM), a central timing module (CTM), a general electronic module (GEM), a body control module (BCM), a suspension control module (SCM), and a control unit, among other types of ECUs. The ECUs may include hardware and embedded software that assist in the operation of machines 102, 104, 105, 106, 107.

In some examples, a machine controller 136 may be located on a respective one of machines 102, 104, 105, 106, 107, and may also include components located remotely from the respective one of machines 102, 104, 105, 106, 107, such as on any of the other machines of system 100 or at the command center described herein (not shown). Thus, in some examples the functionality of machine controller 136 may be distributed so that certain functions are performed on the respective one of machines 102, 104, 105, 106, 107 and other functions are performed remotely. In some examples, machine controller 136 of the local control system carried by a respective machine 102, 104, 105, 106, 107 may enable autonomous and/or semi-autonomous control of the respective machine either alone or in combination with the control system 120. Further, machine controller 136 carried by a respective machine 102, 104, 105, 106, 107 may instruct the respective communication devices 126 and location sensors 130 to function as described herein and as directed by, for example, system controller 122.

In some implementations, machine controller 136 is also in direct communication with the separate components and subsystems of the respective machines 102, 104, 105, 106, 107 to facilitate manual, autonomous, and/or remote monitoring and/or control. For example, machine controller 136 may be in communication with the power source of respective machines 102, 104, 105, 106, 107 to control fueling, the transmission to control shifting, a steering mechanism to control heading, a differential lock to control traction, a braking mechanism to control deceleration, a tool actuator to control material dumping, and with other components and/or subsystems. Based on direct commands from a human operator, remote commands from central station 108 or another one of machines 102, 104, 105, 106, 107 at worksite 112, and/or self-direction, machine controller 136 can selectively adjust operation of the components and subsystems to accomplish a predetermined task.

In some examples, one or more machines 102, 104, 105, 106, 107 of system 100 include an implement or other work tool 140 that is coupled to a frame of the machine. For example, in the case of loading machine 104, work tool 140 is often a bucket configured to carry material within an open volume or other substantially open space thereof. Loading machine 104 includes one or more linkages 142 movably connected to a frame of the loading machine. Work tool 140 is connected to such linkages 142, and the linkages 142 are used to lower the work tool 140 (e.g., via one or more hydraulic cylinders, electronic motors, or other devices connected thereto) to a loading position in which a leading edge 144 of work tool 140 is disposed proximate, adjacent, and/or at work surface 110, and a base of work tool 140 is disposed substantially parallel to work surface 110. Like loading machines 104, digging machines 102, hauling machines 106, compacting machines 105, grading machine 107, may also include work tools 140 and/or linkages 142 that allow the machines to perform their respective operations.

Figure 2:
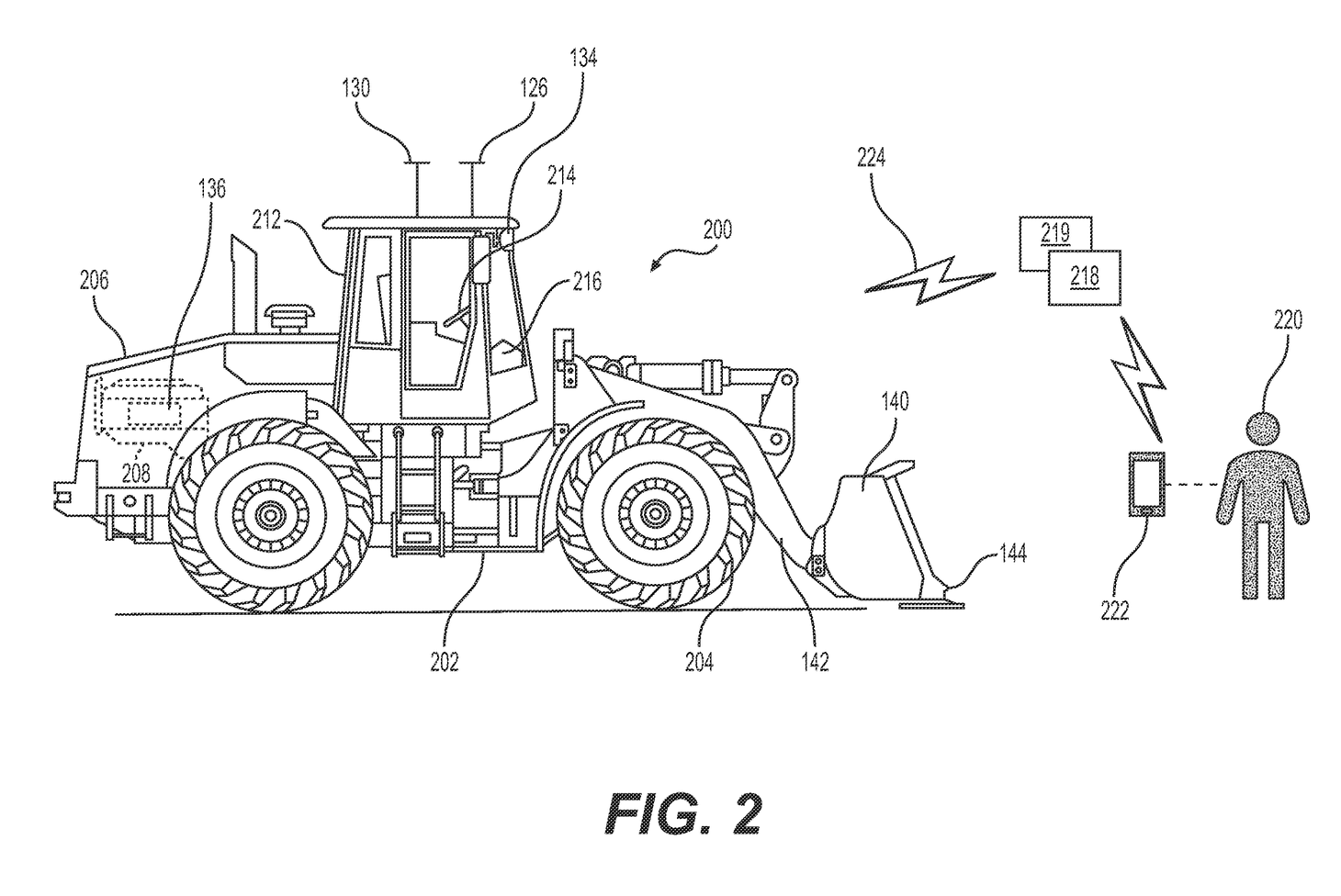
FIG. 2 is a side view of an example work machine and potential operator from FIG. 1 in accordance with an example of the present disclosure.

FIG. 2 illustrates an exemplary work machine 200 as one example suitable for carrying out the principles discussed in the present disclosure. Work machine 200 is illustrated in FIG. 2 as a close-up side view of one of loading machines 104 in FIG. 1, particularly a wheel loader. A wheel loader is representative for discussion purposes only, and work machine 200 could be any type of machine that performs work on worksite 112, such as any of machines 102, 104, 105, 106, 107.

As generally embodied in FIG. 2, work machine 200 includes, among other components, a chassis 202 supported by traction devices 204 (e.g., four wheels with tires), an engine compartment 206 mounted to chassis 202 in a rear section of work machine 200, and an engine 208 within engine compartment 206 and operable to drive traction devices 204 and, thus, to propel work machine 200. Engine 208 is an internal combustion engine such as, for example, a diesel engine, a gasoline engine, an electric-gas hybrid engine, or any other configuration of engine apparent to one skilled in the art. Engine 208 also powers other systems of work machine 200, such as one or more hydraulic cylinders or other mechanisms configured to actuate a work tool 140 connected to the front of work machine 200. Work tool 140 is shown as a bucket configured to transfer material, such as soil or debris. Of course, similar mechanical structures exist in other examples of work machine 200 other than a wheel loader as shown in FIG. 1. Other structural features of work machine 200 are either discussed in relevant context below or excluded solely for purposes of simplicity.

Work machine 200 also includes an operator cabin 212, which can be open or enclosed. Operator cabin 212 includes a seat, a steering system 214, and various controls and electronics for operating work machine 200. Steering system 214 can have a steering wheel, levers, and and/or other controls for steering or otherwise operating work machine 200 as it traverses a path driven by traction devices 204. In such examples, the various components of steering system 214 are connected to one or more actuators, a throttle of work machine 200, engine 208, and a braking assembly (not shown). The steering system is thereby used by an operator of work machine 200 to adjust a speed, travel direction, and/or other aspects of work machine 200 during use.

In some examples, operator cabin 212 also includes a control interface, generally shown as control interface 216 on the dashboard of operator cabin 212, for controlling various functions of work machine 200. Control interface 216 comprises one or more analog, digital, and/or touchscreen displays and may further include a sound source, a light source, or a combination thereof. Control interface 216 may also support other allied functions, including for example and as discussed in further detail below, sharing various operating data with one or more other machines operating in consonance with work machine 200, and/or with a remote server or other electronic device. The controls and electronics within operator cabin 212 may include one or more control devices (not shown), such as joysticks, pedals, levers, user interfaces, buttons, switches, and other types of display and input devices to control various operations associated with work machine 200, such as controlling work tool 140 and activating traction devices 204.

Figure 3:
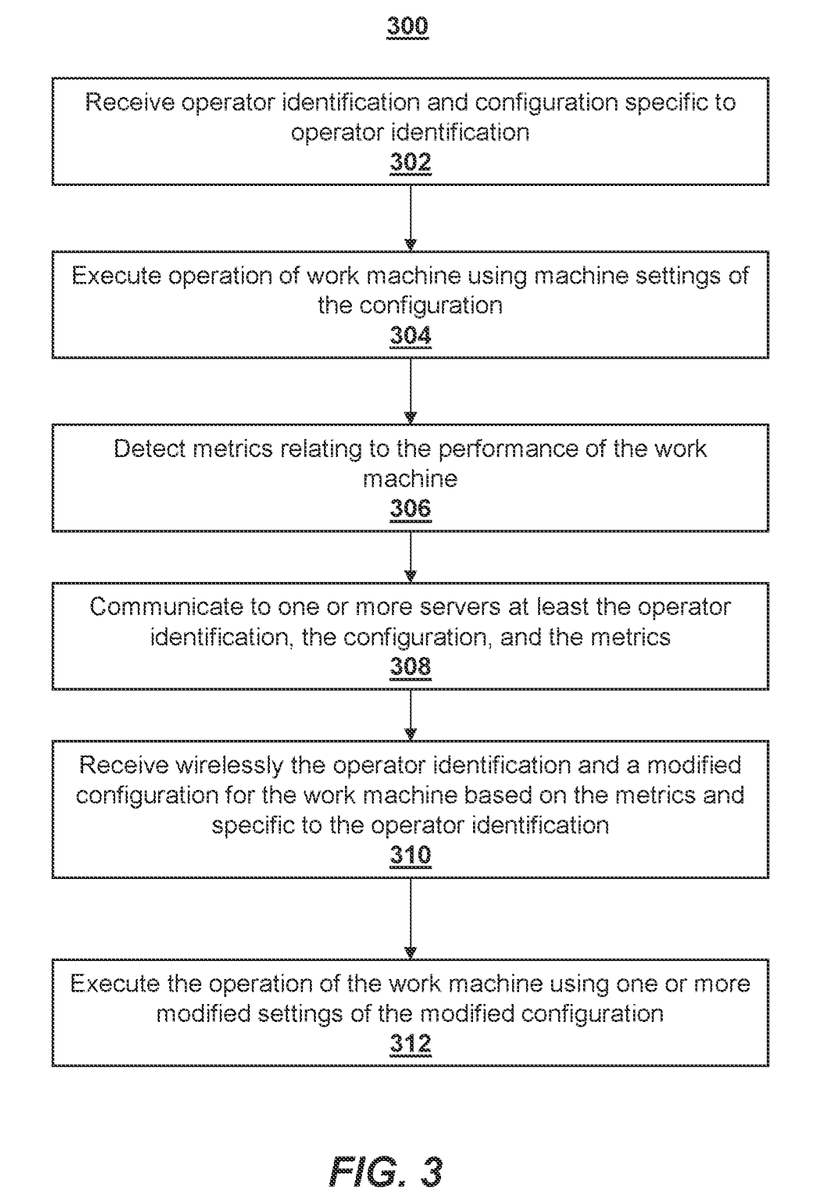
FIG. 3 is a flow chart depicting a method for managing operator configurations in accordance with an example of the present disclosure.

With reference to FIG. 1, which depicts system 100 within worksite 112, and FIG. 2, which shows a representative work machine 200, FIG. 3 is a flowchart of a sample method implemented using work machine 200 consistent with implementations of the present disclosure. As generally summarized in FIG. 3, method 300 entails representative interactions between at least work machine 200 and control system 120.

Method 300 begins with work machine 200 receiving an operator identification, such as operator identification 218 shown in FIG. 2. In an example, control interface 216 within operator cabin 212 includes one or more input/output devices, such as a touchscreen or keypad with display, for an operator to manually log into work machine 200. Typically, the operator, such as operator 220 in FIG. 2, is associated with security credentials, such as an account name or identification code along with a passcode for being able to log in and operate work machine 200. To securely obtain control of work machine 200, operator 220 enters the codes into the one or more input/output devices after which operator 220 is logged into work machine 200. Until operator 220 logs out from work machine 200 or otherwise ceases the running of work machine 200, the functioning of work machine 200 will be associated with the account name or identification code that completed the login process. Accordingly, in some examples, operator 220 may interact with control interface 216 to input personal authentication information, including operator identification 218 into control interface 216 of work machine 200.

After logging into work machine 200, an operator can also enter or review parameters or settings via the one or more input/output devices of control interface 216 for controlling operation of work machine 200. Collectively, the settings or parameters for operating work machine 200 may be termed a "configuration." Configurations for work machine 200 may vary for different types of machines, work activities, and work environments. Examples of configurations include machine settings that are designed into work machine 200 to optimize a particular activity or behavior, such as operating in an "Eco" mode to minimize energy usage or in a traction control mode to enable a differential lock based on sensed wheel speeds to improve traction and save on tire wear.

Many other configurations are possible and may vary based on the type of machine. For example, cold planers and reclaimer mixers may have a load control configuration in which machine settings are made to control operation of the machine based on an engine torque curve and rotor speed, which is dependent on a load that material is applying to the machine. In another example, compactors have a vibration control configuration, in which the response of material that is being compacted is sensed, and the difference between the energy the compactor is putting into the material and the response of the material is measured to determine if fuel and time are being wasted. In yet other examples, work machine 200 has settings that sense and limit the number of times that hydraulic systems on the machine are pushed to their relief pressure, i.e., where maximum force is being applied, which can help avoid premature breakdowns. Further collections of settings or prearranged configurations for work machine 200 are contemplated and are within the knowledge and experimentation of those of ordinary skill in the art.

Each operator may prefer a configuration for work machine 200 that could depend on the operator's experience with work machine 200 or the work activity to be performed. At least to avoid the inefficiency of having to enter a configuration repeatedly at each login to a machine, work machine 200 in some examples stores in memory electronic data of a configuration previously entered by an operator. A configuration or collection of machine settings associated with a particular operator may be termed an "operator-specific" configuration or "operator-specific" settings, such as operator-specific configuration 219. To store a configuration as operator-specific data, work machine 200 associates operator-specific configuration 219 entered by an operator with the identification code unique to that operator. Work machine 200 can then access the stored operator-specific configuration 219 from memory the next time the associated operator identification 218 is entered during login, saving the operator the need to set up the machine with the preferred configuration.

In some implementations, operator-specific configuration 219 is stored in machine controller 136 of work machine 200. Machine controller 136 provides memory and computing power through a processor to execute software instructions for coordinating various electronic actions, which may be used to assist mechanical, hydraulic, or pneumatic activities within work machine 200. For example, machine controller 136 can be configured to automatically retrieve saved settings for work machine 200 for a particular operator (i.e., operator-specific configuration 219 for operator identification 218) and automatically set work machine 200 to operate in accordance with the saved parameters. The location for storing electronic data representative of operator-specific configuration 219 is not material to the present disclosure, and options are within the knowledge of those skilled in the art.

As generally illustrated for the implementation of FIG. 2, an operator 220 can also log into work machine 200 remotely through a wireless connection rather than manually via control interface 216. A wireless operator device 222, such as a cellular phone, laptop computer, tablet, or a keyfob, may establish a network connection with a controller, such as machine controller 136, via communication device 126 on work machine 200. The network connection can be through various types of connectivity, such as WiFi, GPS, RFID, near-field communications (NFC), etc., and generally is a peer-to-peer connection 224 such as Bluetooth. Alternatively, the network connection between operator device 222 and communication device 126 is not a peer-to-peer connection and can occur, for example, using GPS coordinates in conjunction with GPS satellite 132 or using a cellular or other type of indirect communication between operator device 222 and communication device 126.

With peer-to-peer connection 224, the network connection typically is established automatically based on proximity of operator device 222 to work machine 200. When operator device 222 comes within range, an application or other software within operator device 222 will connect with communication device 126 within work machine 200 and automatically provide authentication information associated with operator 220, e.g., operator identification 218 and a passcode. For instance, range for Bluetooth connectivity is generally about 10 meters, while NFC range is about 4 centimeters, which would require operator device 222 to be held close to a detector on work machine 200. After peer-to-peer connection 224 is established and authentication information is successfully provided electronically, operator 220 is logged into work machine 200. If an operator-specific configuration 219 corresponding to operator identification 218 is stored in work machine 200, that configuration is retrieved and work machine 200 is set up accordingly for operation.

In some situations, operator device 222 transmits settings for work machine 200, such as its operator-specific configuration 219, across the network connection such as peer-to-peer connection 224. For instance, when operator 220 has not operated work machine 200 before, work machine 200 will not have a configuration stored for operator 220. Rather than have operator 220 load the operator-specific configuration 219 manually, operator device 222 can provide the configuration with the operator identification remotely. Similarly, if operator 220 has operated work machine 200 before but wishes to set up the machine with a different configuration than what is stored in work machine 200, operator device 222 can provide the different configuration via peer-to-peer connection 224.

After receiving operator identification 218 and operator-specific configuration 219 from operator 220 at work machine 200, method 300 of FIG. 3 continues with the execution of an operation of work machine 200 using the one or more machine settings of operator-specific configuration 219. As shown at 304, work machine 200, and in particular machine controller 136, executes an operation of work machine 200 using machine settings of the operator-specific configuration 219. One example of operator-specific configuration 219 may be Eco-mode for the engine 208. With operator-specific configuration 219 corresponding to Eco-mode, work machine 200 will set various operational conditions for engine 208 and operator cabin 212 to conserve fuel. These may include operating engine 208 at lower revolutions per minute, inhibiting a rate of acceleration for engine 208, decreasing a rate of change for climate control within operator cabin 212, and other settings. Machine controller 136 will initiate appropriate electronic signals to subsystems and components within engine 208 and elsewhere in work machine 200 so that work machine 200 expends less energy and uses less fuel than normal. Another example may be activation of a differential lock to assist with traction and steering. These various modes of operation will be read from the operator-specific configuration 219 and executed by work machine 200 during operation of a work activity for operator 220 within worksite 112.

During operation of this work activity by work machine 200, sensors 134 will detect operational conditions and collect performance metrics for work machine 200, in a manner described above. Specifically, sensors 134 throughout work machine 200 will collect data relating to operation of the machine, such as information about speed, maneuvering, and engine diagnostics. Relevant to the Eco-mode of operation, for example, sensors 134 in some implementations will detect data relating to fuel consumption, temperature within operator cabin 212, acceleration behavior of engine 208, and similar characteristics. Work machine 200 can collect many other types of telematics data, as described above and within the knowledge of those of ordinary skill in the art.

In a subsequent step 308, work machine 200 communicates at least operator identification 218, operator-specific configuration 219, and the sensed data as performance metrics (or telematics data) to control system 120 via network 124 in a manner discussed above. In some examples, control system 120 and system controller stores the received information and possibly evaluates the metrics for performance irregularities. In certain aspects, the received data may be analyzed based on customized rules for a particular user, site, organization, or scenario. As discussed above, system controller 122 may comprise one or more servers having one or more processors and one or more computer-readable media. The computer-readable media store computer executable instructions as software that, when executed, cause the one or more processors to perform various operations related to evaluating the metrics for performance irregularities.

After or while receiving the telematics data associated with operator identification 218, system controller 122 analyzes the data. In some examples, the analysis occurs by looking for performance metrics specific to operator 220 as informed by operator-specific configuration 219. While a machine can exhibit mechanical, electrical, and/or hydraulic issues characteristic of that machine, the functioning of the machine may also be directly impacted by the choices and behaviors exhibited by the operator when the performance metrics were generated. Thus, although telematics data received by system controller 122 for work machine 200 may generally provide a basis for evaluating work machine 200 together with other machines of a fleet at a machine level, associating the performance metrics to operator identification 218 and operator-specific configuration 219 provides a basis for analyzing the metrics at an operator level.

Analysis of the performance metrics, as associated at least with operator identification 218, can identify any performance irregularities of work machine 200 while the machine was controlled by operator 220. For the purposes of this disclosure, a performance irregularity can be defined as a non-failure deviation from a historical, expected, or desired machine or worksite performance (e.g., productivity, efficiency, emission, traffic congestion, or similar related performance) that is monitored, calculated, or otherwise received by system 100.

In one aspect, an amount of deviation required to qualify as an irregularity is set by a supervisor, a business owner, or other entity with responsibility for work machine 200. This entity interacts with data collected from work machine 200 by system controller 122 via one or more electronic devices 128. One of the electronic devices 128 could be termed a supervisory computer. The supervisory computer provides an interface for the supervisor or business owner to input parameters for determining a baseline or benchmark against which an operator's usage of a machine is judged. For instance, via electronic device 128, an owner could indicate that operator 220 should not exceed a particular amount of fuel consumption per unit time or for a particular work activity. System controller 122 may then analyze the performance metrics personal to operator 220, keyed to operator identification 218 and operator-specific configuration 219, to determine whether operator 220 has complied with the baseline or benchmark set by the owner.

In some examples, system controller 122 generates results from the analysis, which can include a productivity analysis, an economic analysis (e.g., efficiency, fuel economy, operational cost, etc.), a cycle time analysis, an environmental analysis (e.g., engine emissions, road conditions, site conditions, etc.), or other analysis specific to work machine 200, each category of machines within worksite 112 (i.e., for digging machines 102, loading machines 104, compacting machines 105, hauling machines 106, or grading machines 107), each co-located machine, and/or for the worksite 112 as a whole. In one aspect, results of the analysis may be indexed according to time, for example, according to a particular work shift, a particular 24-hour period, or another suitable parameter (e.g., time period, liters of fuel, cost, etc.).

In some options, electronic device 128 presents results of the data analysis to the owner or other entity, such as through a display on the supervisory computer, i.e., electronic device 128. The results of the analysis may be in the form of detailed reports or they may be summarized as a visual representation such as, for example, with an interactive graph. The results may be used to show a historical performance, a current performance, and/or an anticipated performance of operator 220. Accordingly, method 300 enables an owner or fleet manager to view performance and other analytical results by operator (when collecting data from operator 220 and other operators working with the fleet) as well as by machine, if desired. Alternatively or additionally, the results could be used to predict a progression of operations at worksite 112 and to estimate a time before the productivity, efficiency, or other performance measure of operator 220 becomes irregular (i.e., exceeds or falls below a desired or expected limit). As an example, the results of the analysis may indicate when a performance irregularity has occurred, is currently occurring, or anticipated to occur in the future. In some options, system controller 122, via electronic device 128, may provide a flag or notify the owner either at the time the irregularity occurs or during the analysis stage when the irregularity is first detected and/or anticipated.

Identification of an actual or potential performance irregularity specific to usage of work machine 200 by an operator can arise from analyzing various types of data received from work machine 200. In some examples, a performance irregularity is identified by evaluating the received telematics in conjunction with operator identification 218. Here, system controller 122 may determine from the received telematics that operator device 222 is operating outside of a baseline or benchmark of performance while operator 220 is in control of the machine. For instance, system controller 122 may conclude that operator 220 is operating work machine 200 at a speed, load capacity, duration, or other parameter inconsistent with values identified by system controller 122 as desired, regardless of the particular machine settings within operator-specific configuration 219. This information from the telematics may indicate that operator 220 is controlling work machine 200 in a manner that may lead to premature degradation or break down of work machine 200 or increased risk to operator 220 or other personnel at worksite 112.

In other situations, a performance irregularity can be identified through analysis of only operator identification 218 and operator-specific configuration 219. That is, system controller 122 can evaluate operator-specific configuration 219 and identify deviations of machine settings used by operator 220 beyond those suitable for the baseline or benchmark performance of work machine 200. For example, if the owner or supervisor expects that operator 220 will operate work machine 200 in Eco-mode but the received operator-specific configuration 219 for operator identification 218 indicates that operator 220 is not operating in Eco-mode, work machine 200 and operator 220 may be flagged as a performance irregularity. Actual performance metrics received from communication device 126 on work machine 200 may not be needed to reach this conclusion. In yet other situations, actual or potential performance irregularities tied to operator 220 may be identified by evaluating together all of operator identification 218, operator-specific configuration 219, and the telematics received from work machine 200.

If analysis by system controller 122 or reports provided to the owner through electronic device 128 indicate an actual or potential performance irregularity by operator 220, corrective action can be taken. The feedback from operator-specific data can provide an owner or fleet manager with a more granular look at performance for the fleet beyond the equipment itself. In some examples, the owner can communicate the need for changed behavior to operator 220 or can initiate coaching to better educate operator 220 on the preferred method of operating work machine 200. For instance, having operator-specific data regarding the operation of equipment such as work machine 200, the owner can knowledgeably discuss with operator 220 the benefits of operating work machine 200 in Eco-mode, which may help modify future behavior of operator 220. When applied across a fleet of machines, coaching targeted to only those operators having demonstrated poor performance can more efficiently lead to a material change, such as a fleet-wide decrease in fuel consumption or machine breakdown. The coaching recommendations may be pushed from system controller 122 to the application running on operator device 222 for review and use by operator 220.

Additionally or alternatively, system controller 122 can maintain a repository of operator profiles for the individual that control equipment in the owner's fleet. Among other potential data, the operator profiles at least include operator identification 218 and operator-specific configuration 219 as received from work machine 200. If the owner desires corrective action for operator 220, system controller 122 receives input from the owner via electronic device 128 indicating a desired change to operator-specific configuration 219 to overcome the performance irregularity. For example, noting from the received telematics and/or from operator-specific configuration 219 that operator 220 is consuming excessive amounts of fuel or otherwise not operating in Eco-mode, the owner may provide input to electronic device 128 to force a change to the configuration used by operator 220 for work machine 200. Accordingly, system controller 122 generates a modified operator-specific configuration 219 in which the parameters for operator identification 218 will include setting up the machine to operate in Eco-mode. The updated or modified operator-specific configuration 219 will be stored as part of the operator profile for operator 220 in control system 120. Additionally or alternatively, in some examples modified operator-specific configuration 219 is downloaded to an application running in operator device 222 and stored within operator device 222 for future use.

Turning back to method 300 of FIG. 3, in step 310, work machine 200 and particularly communication device 126, receives wirelessly operator identification 218 and modified operator-specific configuration 219 for work machine 200 from control system 120. When operator 220 next logs into work machine 200, modified operator-specific configuration 219 is applied as the set of parameters for operator 220 to operate work machine 200. This updated data may be transmitted wirelessly in many ways. In some examples, modified operator-specific configuration 219 will be installed by machine controller 136 when operator 220 approaches work machine 200 and uses the application running in operator device 222 to establish peer-to-peer connection 224, as discussed above for FIG. 2. In this situation, if the application on operator device 222 does not already have modified operator-specific configuration 219, operator device 222, which may be a cellular phone or a tablet, for example, can access operator identification 218 and modified operator-specific configuration 219 through its application by way of a cellular data connection, Wi-Fi, or similar path. After operator device 222 provides accepted authentication information and operator identification 218 is registered as the operator for work machine 200, the application within operator device 222 will transmit modified operator-specific configuration 219 to communication device 126 in association with operator identification 218. Modified operator identification 218 will be set to override any previously stored configurations for operator 220 to ensure that operator 220 abides by the owner's settings. Consequently, work machine 200 will be loaded with modified operator-specific configuration 219 when operator 220 next attempts to operate work machine 200.

In other examples, operator identification 218 and modified operator-specific configuration 219 from the updated user profile for operator 220 will be downloaded wirelessly from system controller 122 via network 124 to communication device 126 in work machine 200. Again, modified operator-specific configuration 219 will be set to override any previous parameters and settings associated with operator identification 218, and work machine 200 may then store modified operator-specific configuration 219 in association with operator identification 218 in memory for future access with respect to operator 220.

Finally, in step 312, operator 220 performs again the operation of work machine 200 in executing a work activity. At this time, machine controller 136 accesses settings for work machine 200 associated with operator identification 218 and retrieves modified operator-specific configuration 219. Machine controller 136 then generates appropriate electronic signals for controlling operation of work machine 200 consistent with modified operator-specific configuration 219. For instance, by operating work machine 200 according to modified operator-specific configuration 219, machine controller 136 forces operator 220 to function according to the settings of modified operator-specific configuration 219, which may include requiring operation of work machine 200 within the Eco-mode to conserve fuel.

In some examples, machine controller 136 in work machine 200 is configured to prevent operator 220 from manually changing a mode of operation set by operator-specific configuration 219 that was received from control system 120. In this way, the supervisor or owner of work machine 200 can ensure that its management of the settings for work machine 200 remains intact. Thus, once operator 220 has initially provided a configuration for work machine 200, machine controller 136 thereafter will not allow a manual change to the machine settings affected by modified operator-specific configuration 219 received from control system 120. Other settings could still be configurable. For instance, if the owner has overridden the use of Eco-mode to require its implementation, operator 220 could still be able to implement other changes to machine settings, such as through control interface 216, to affect steering and traction capabilities by activating a differential lock.

Thereafter, when operated by operator 220, work machine 200 will be set up according to modified operator-specific configuration 219. As the machine is used going forward and new telematics are collected for operator identification 218, modified operator-specific configuration 219 may be updated again to conform to whatever standards or desires the owner or fleet manager seeks. A balance may be struck by the owner or fleet manager overriding only a subset of settings for work machine 200 while allowing operator 220 the flexibility to select other parameters to customize operation of the machine. This flexibility and the ongoing sensing, measurement, and feedback of data within system 100 as work activities proceed will be apparent to those of ordinary skill in the art.

INDUSTRIAL APPLICABILITY

The present disclosure provides systems and methods for managing operator settings for work machines within a fleet of work machines. A control system within a worksite collects operator-specific configurations, identifications for the operators, and performance metrics while the machines execute a work activity. Comparing the performance metrics or the operator-specific configurations with benchmarks or historical data for the fleet enables the identification of performance irregularities for selected operators. As a result, the system and method enables an owner or fleet manager to evaluate fleet performance at an operator level in addition to a machine level. Operator behavior may be improved by providing targeted coaching recommendations based on specific telematics data collected from previous operation of the work machines. As well, utility of the fleet may be increased because the system may generate modified operator-specific configurations and override machine settings that led to the performance irregularities, potentially decreasing downtime, repair costs, and fuel consumption.

As noted above with respect to FIGS. 1-3, an example method for a work machine 200 includes receiving, by an electronic controller 136 of the work machine, an operator identification 218 associated with an operator 220 of the work machine; receiving, by the electronic controller, an operator-specific configuration 219 for the work machine; executing an operation using one or more machine settings of the operator-specific configuration 219; detecting, by one or more sensors 134 on the work machine, metrics relating to the performance of operator 220; and communicating, over a network connection from the work machine to one or more servers of a control system 120, at least operator identification 218, operator-specific configuration 219, and the metrics. Accordingly, work machine 200 provides operator-specific settings and resultant performance data that can enable granular analysis and correction.

In examples of the present disclosure, a control system 120 analyzes the received information and causes display, on a user interface of an electronic device 128, of a difference between the performance metrics and a baseline for the operation of work machine 200. The owner or other entity can evaluate a fleet of machines, identify anomalies caused by an operator rather than a machine, and adjust performance on an operator-level. In particular, the owner may provide input affecting a change from an initial operator-specific configuration to a modified operator-specific configuration corresponding to operator identification 218 and override previous machine settings for subsequent use by operator 220. Therefore, the performance of operator 220 may be changed, potentially improving the efficiency of work machine 200 and possibly the fleet.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should fall within the scope of the present disclosure as determined based upon the claims and any equivalents thereof.

What is claimed is:

1. A method, comprising:
    receiving, by an electronic controller of a work machine, an operator identification associated with an operator of the work machine;
    receiving, by the electronic controller, a configuration for the work machine specific to the operator identification, the configuration comprising one or more machine settings for an operation of the work machine;
    executing the operation of the work machine using the one or more machine settings of the configuration based, at least in part, on first electronic commands provided to components of the work machine from the electronic controller;
    detecting, by one or more sensors on the work machine, metrics relating to performance of the work machine;
    communicating, over a network connection from the work machine to one or more servers, at least the operator identification, the configuration, and the metrics;
    receiving wirelessly the operator identification and a modified configuration for the work machine specific to the operator identification, the modified configuration differing from the configuration due at least in part to the metrics; and
    executing the operation of the work machine using one or more modified settings of the modified configuration based, at least in part, on one or more second electronic commands provided to the components of the work machine from the electronic controller.

2. The method of claim 1, further comprising:
    establishing a wireless connection between the work machine and an operator device; and
    performing over the wireless connection the receiving wirelessly the operator identification and the modified configuration for the work machine specific to the operator identification.

3. The method of claim 2, wherein the establishing the wireless connection comprises:
    detecting the operator device within a physical range of the work machine for a peer-to-peer network;
    authenticating the operator identification for access to use one or more features of the work machine; and
    enabling the operation of the work machine according to the modified configuration.

4. The method of claim 1, wherein the receiving the operator identification and the receiving the configuration for the work machine specific to the operator identification comprises retrieving the operator identification and the configuration from memory in the work machine associated with the electronic controller.

5. The method of claim 4, further comprising storing, by the electronic controller, the modified configuration in the memory in association with the operator identification.

6. The method of claim 1, further comprising:
    causing display, on a user interface of a supervisory computer, of a difference between the metrics and a baseline for the operation of the work machine;
    receiving, at the supervisory computer, input affecting a change from the configuration to the modified configuration for the operator identification; and
    causing transmission of the operator identification and the modified configuration for subsequent use by the operator on the work machine.

7. The method of claim 6, wherein the change comprises updating an operator profile associated with the operator identification stored in the one or more servers.

8. The method of claim 7, wherein the work machine is one of a fleet of work machines and the baseline comprises data relating to past performance of other work machines in the fleet of work machines.

9. The method of claim 7, wherein the transmission comprises sending the operator identification and the modified configuration from the one or more servers to an application on an operator device.

10. A system, comprising:
    a work machine including one or more sensors and a controller, the one or more sensors configured to detect performance characteristics of the work machine during a first instance of a work activity executed by an operator, the controller configured to cause the performance characteristics and an initial operator-specific configuration for the work machine to be transmitted across a wireless network, the initial operator-specific configuration associated with an identification of the operator;
    one or more servers coupled to the work machine through the wireless network, the one or more servers comprising one or more processors and one or more computer-readable media, the one or more computer-readable media storing computer-executable instructions that, when executed, cause the one or more processors to perform operations comprising:
        receiving the performance characteristics and the initial operator-specific configuration from the work machine;
        accessing benchmark data associated with at least one of the performance characteristics and the initial operator-specific configuration; and
        generating a new operator-specific configuration for the work machine based, at least in part, on the benchmark data,
    wherein the controller of the work machine is further configured to override the initial operator-specific configuration with the new operator-specific configuration for a second instance of the work activity executed by the operator.

11. The system of claim 10, wherein the operations further comprise:
    causing the new operator-specific configuration to be sent to a device associated with the identification for communication with the work machine.

12. The system of claim 11, wherein the controller of the work machine is further configured to:
    establish a connection with the device over a peer-to-peer network based on proximity of the device to the work machine; and
    receive the new operator-specific configuration from the device over the peer-to-peer network.

13. The system of claim 11, further comprising:
a supervisory computer coupled to the one or more servers, the supervisory computer configured to provide the one or more servers with one or more parameters for generating the new operator-specific configuration.

14. The system of claim 11, wherein the work machine is one of a fleet of work machines and the benchmark data comprises metrics relating to past performance of other machines in the fleet of work machines.

15. The system of claim 10, wherein generating the new operator-specific configuration comprises updating an operator profile associated with the identification stored in the one or more servers.

16. A machine, comprising:
an engine;
a work tool;
one or more sensors configured to detect performance characteristics of the machine during execution of a work activity;
an electronic controller configured to:
receive an operator identification associated with an operator of the machine;
receive initial settings for the machine specific to the operator identification;
cause a first execution of the work activity by the machine using the initial settings;
cause the operator identification, the initial settings, and the performance characteristics to be sent to one or more servers over a network connection;
receive modified settings for the machine specific to the operator identification, the modified settings differing from the initial settings due at least in part to the performance characteristics detected by the one or more sensors; and
cause a second execution of the work activity using the modified settings.

17. The machine of claim 16, wherein the electronic controller is further configured to:
establish a connection with an operator device over a peer-to-peer network based on proximity of a user device to the machine, wherein the modified settings are received from the operator device over the peer-to-peer network.

18. The machine of claim 17, wherein the electronic controller is further configured to:
detect the operator device within a physical range of the machine for the peer-to-peer network;
authenticate the operator identification for access to use one or more features of the machine; and
enable the operation of the machine according to the modified settings.

19. The machine of claim 16, wherein the electronic controller of the machine is further configured to:
store the initial settings associated with the operator identification in memory; and
override the initial settings with the modified settings.

20. The machine of claim 16, wherein the modified settings alter the performance characteristics of the machine for the second execution of the work activity.

* * * * *